Feb. 11, 1964 J. KELAR ETAL 3,121,215
SELF-CHECKING PULSE TRANSMISSION TECHNIQUE
Filed Aug. 3, 1960 2 Sheets-Sheet 1

INVENTORS
RICHARD L. DENNISON
JOSEPH KELAR
NORMAN E. DAGGETT
BY *Frederick C. Meyers*
ATTORNEY

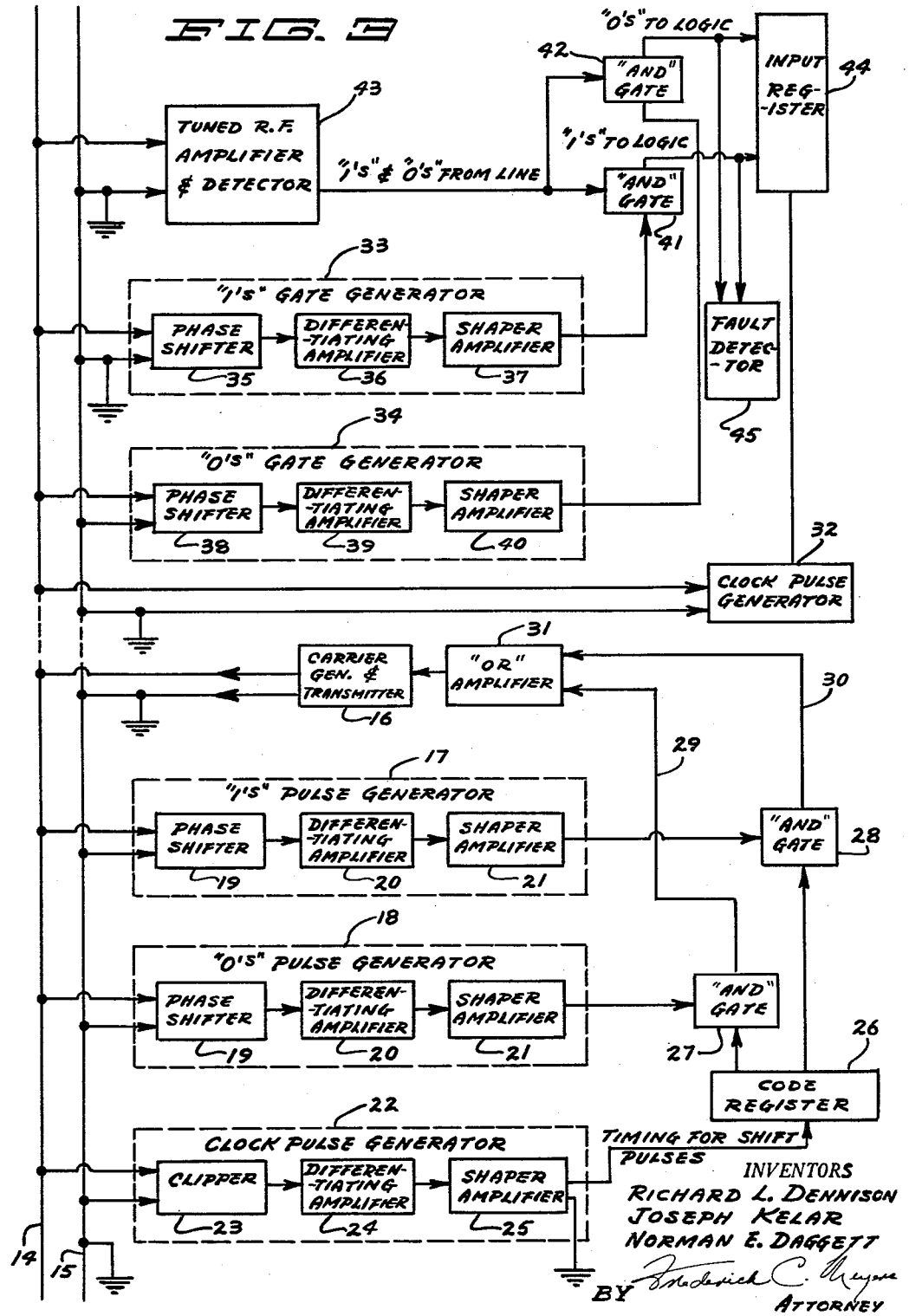

United States Patent Office 3,121,215
Patented Feb. 11, 1964

3,121,215
SELF-CHECKING PULSE TRANSMISSION
TECHNIQUE
Joseph Kelar, Richard L. Dennison, and Norman E.
Daggett, Minneapolis, Minn., assignors to Magnetic
Controls Co., Minneapolis, Minn., a corporation of
Minnesota
Filed Aug. 3, 1960, Ser. No. 47,261
8 Claims. (Cl. 340—146.1)

This invention relates to electric telemetering and computation and more particularly to a method of transmitting digital pulse information from one location to another with self-checking for reliability of the transmitted information.

In transmitting coded information by electronic pulse means, there are three types of errors which can reduce or destroy the reliability of the code transmission. The first of these is human error in compiling or feeding information to the equipment. The second source of error lies in malfunction of the equipment itself, and the third is the false relaying of correct intelligence through equipment which is functioning properly. The third situation is the most troublesome and is the most difficult to check since the influencing factors are not continuing or capable of being stored so that they can be reviewed and scrutinized. The problem arises with the introduction of random pulses where there should be none, or the cancellation of pulses where they should be supplied. These random effects are generically called "noise" and include an extraneous influence which will produce or obliterate pulses, such as induced electrical effects from other equipment, static or other natural phenomena, all of which can produce discontinuous and unpatterned voltage or current transients.

Out of a certain number of transmitted encoded characters, the repetition of the same received intelligence can be assumed as verifying the correctness of the intelligence. However, the greater the number of inconsistent results as compared to consistent results, the lower is the probability that the consistent results yield the true answer or message. Furthermore, such cut and try methods are purely empirical and are costly as well as time consuming.

It is within the contemplation of the present invention and a general objective thereof to reduce to virtual certainty the recognition of correct pulse code intelligence or the instantaneous rejection of false intelligence upon reception thereof.

More specifically, it is an object of the invention to provide a method of true pulse code transmission which can be checked in the presence of noise while operating at a low level of pulse power.

A further object of the invention is to provide a technique for checking the accuracy of pulse codes in the binary system wherein a time differential is selected to establish the unique difference between a binary "1" and "0."

These and other objects and advantages of our invention will more fully appear from the following description, made in connection with the accompanying drawings, wherein like reference characters refer to the same or similar parts throughout the several views and in which:

FIGURE 3 is a block diagram of the transmitting and receiving stations showing the synchronized clock pulse generation and the system by which the accuracy of transmission becomes self-checked.

Figures 1, 2:
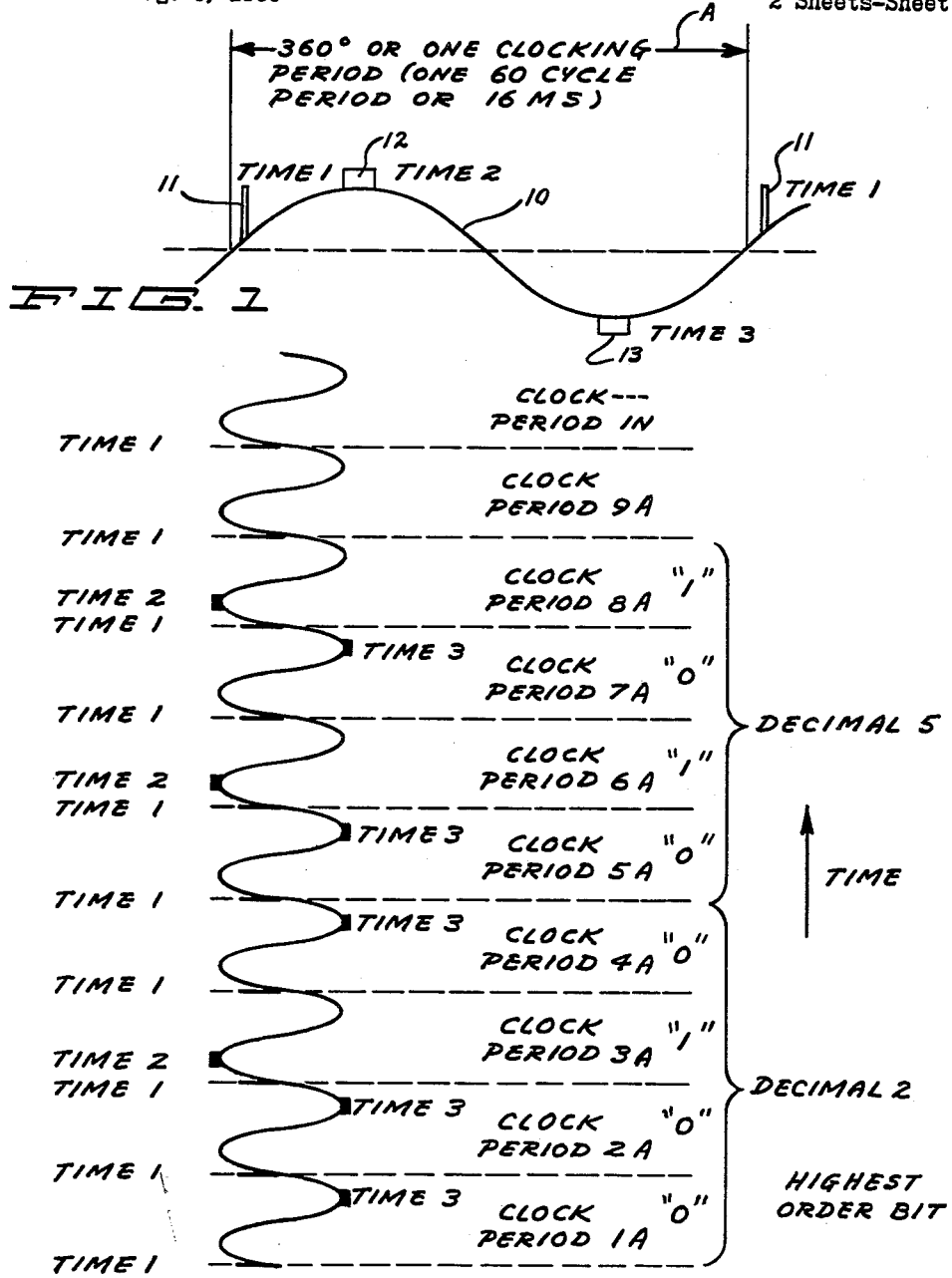
FIGURE 1 represents schematically a single clocking period for the control logic and includes the clocking and pulsing times in relation to a sinusoidal wave.
FIGURE 2 is a diagrammatic representation of a transmission sequence for binary coded decimal 25 using the pulse transmission technique of the invention.

Referring now to FIGURE 1, a single clocking period is represented as A and includes a single cycle period typically associated with commercial electrical current generation of 60 cycle power. The clocking medium thus utilizes sinusoidal wave generation shown at 10 and represents a full 360° for the clocking period which in the example shown constitutes 1/60 of a second. The beginning of the clocking period is shown at first time increment 11. All logical functions or data transfers within a piece of logic are accomplished during the clocking period A but no transmissions are made at the starting time 11. The first transmission period occurs during the second time increment 12. During the time increment 12, a binary "1" may be transmitted onto the line. The time increment 12 occurs approximately 90° after starting time 11 and is synchronized substantially with the positive peak of sinusoidal wave 10.

The sinusoidal wave then passes from positive to negative and the third time increment 13 occurs at approximately 180° after the second time increment 12, or 270° after starting time 11. The time increment 13 is allocated to the transmission of a binary "0" and occurs at approximately the negative peak of sine wave 10 in the clocking period. The sine wave then passes back from negative to positive and another clocking period is begun with the first timing increment 11 followed by a second clocking period and so forth. It is understood that the time increments allotted to binary "1's" and "0's" may be interchanged.

In accordance with the present invention, provision is made to prevent the legal transmission of a binary "0" at time increment 12 or a binary "1" at time increment 13 and furthermore, provision is made arbitrarily to prevent legal transmission of both a binary "1" pulse and a binary "0" pulse in the same clocking period A. It will be observed that each clocking period A includes a couplet of pulsing positions and that the code pulse must have its position distinguished within each clocking period. It is therefore possible to have one or more couplets in the same clocking period, if desired, in which case the time increment 12 would be subdivided into a plurality of such increments and similarly the time increment 13 would be subdivided into a similar number of distinct gated time increments. In any event, the transmission technique comprehends only couplets of positions and hence a specific time increment at 13 must be paired with a specific time increment 12 in order to practice the invention.

Referring now to FIGURE 2, a transmission sequence is shown by way of example for transmitting the binary coded decimal 25 which in binary characters is 00100101. It will be observed that throughout the sequence of consecutive clocking periods 1A through 8A only one bit of information is transmitted during one clocking period. Either binary "1" or binary "0" may be transmitted during a single clocking period but not both. Should a pulse appear during both of time increments 12 and 13, signifying a binary "1" or "0" in the same clocking period, then the transmission sequence is considered a fault and the entire message will be rejected.

Gate generation circuits are utilized such that gate pulses with manually controllable gate width are generated during second time increment 12 and third time increment 13. In order to produce a legal signal, a pulse must be applied to the line during one of the gate times occurring at time increment 13. It is understood that signals will not be passed at any other time during a clocking period. If the character of a transmitted signal is a simple pulse, a wide band network may be utilized at the receiver. If the transmitted signal is a pulse modulated carrier, a high Q tuned network may be employed at the receiver. While simple pulses and pulse modulated carriers may be employed, the latter is preferred because of the higher signal to noise ratio which improves the probability of producing an acceptable reception of the transmitted signal in the presence of noise interference.

In carrying out the pulse transmission technique of the invention, reference is made to FIGURE 3. The transmission line circuit is indicated as 14 and 15 and all functions are synchronized through clock pulse generation. In the diagram, the carrier generator and transmitter 16 supplies synchronized pulses from the "1's" pulse generator 17 and the "0's" pulse generator 18 as indicated.

Each of the pulse generators is provided with a phase shifter 19 followed by a differentiating amplifier 20 and shaper amplifier 21. Each of the pulse generators 17 and 18 is connected to the line 14, 15 and both produce continuous trains of pulses, the pulses from generator 17 being supplied for second time increment 12 and the generator 18 supplying a like continuous train of pulses for third time increment 13 in clocking period A of FIGURE 1. The clock pulse generator 22 provides synchronization with periodicity of frequencies at line 14, 15. Clock pulse generator 22 employs in sequence, a wave form clipper 23 which squares sinusoidal wave forms from line 14, 15 so that they can be differentiated, a differentiating amplifier 24 which differentiates the output from clipper 23 in respect to time and simultaneously amplifies the pulses, and a shaper amplifier 25 which functions to further shape and amplify the output of differentiating amplifier 24 to condition it for practical use as shown in FIGURE 3. The synchronized pulses are then fed to code register 26 where they affect D.C. levels which represent binary "1's" and "0's" which have been previously inserted into the register 26. These changing D.C. levels are applied to "and" gate 27 for the "0's" pulse generator 18, and to the "and" gate 28 for the "1's" pulse generator 17. The "and" gate 27 supplies pulses for "0" channel 29 only when a pulse is received from generator 18 simultaneously with the proper D.C. level from code register 26. Similarly, pulses are supplied to the "1" channel only when a pulse is received from generator 19 simultaneously with the proper D.C. level from code register 26.

The "0's" pulse channel 29 and the "1's" pulse channel 30 leads to the "or" amplifier 31 which controls the transmission of only one pulse for each clocking period.

The block diagram elements in FIGURE 3 which have been described to this point constitute the transmitting portion of the system. The receiving portion also utilizes a clock pulse generator indicated at 32 which synchronizes the pulses from line 14, 15 and renders the entire system synchronous with respect to the sinusoidal wave generation applied to the line. As in the case of the transmitting portion of the system, the receiving elements also include generators for "1's" and "0's," the "1's" gate generator being indicated at 33 and the "0's" gate generator being indicated at 34. Generator 33 contains a phase shifter 35, a differentiating amplifier 36 and a shaper amplifier 37 as shown. Similarly, the "0's" gate generator 34 is also provided with a phase shifter 38, a differentiating amplifier 39 and a shaper amplifier 40. The "and" gate 41 extracts "1" pulses from generator 33 while the "and" gate 42 extracts "0" pulses from generator 34. The gate generators 33 and 34 operate continuously to generate their respective gates at second time increment 12 and third time increment 13 of each clocking period as viewed in FIGURE 1, it being remembered that the entire system is synchronized through clock pulse generator 32 at the transmitting location and clock pulse generator 32 at the receiving portion.

A tuned RF amplifier and detector 43 is connected to line 14, 15 which in turn extracts transmitted "1's" and "0's" from the line and applies them to both the "and" gate 41 and "and" gate 42. "1" pulses pass the "and" gate 41 only when a simultaneous "1" pulse is received from the detector 43. Similarly, "0's" pass the "and" gate 42 only when a simultaneous pulse is received from detector 43. "1" and "0" pulses are supplied when passed from their respective gates to the input register 44 in which the coded intelligence is accumulated and stored for subsequent use. A fault detector 45 receives all pulses from "and" gates 41 and 42 and analyzes the received intelligence for fault conditions.

It thus may be seen that the clocking periods and transmission times coupled with the arbitrary transmission laws and the synchronizing wave form produce a code transmission technique in which random noise will not cause the equipment to accept erroneous information.

Referring again to FIGURE 2, at the start of clock period 1A, the receiving equipment is preconditional for reception of information, therefore, it will be anticipating information between the start of clock period 1A and the end of clock period 8A. Because of the arbitrary law utilized in the herein disclosed transmission technique, each clocking period must contain only a "1" or a "0" and only at its proper point in time, namely time increment 12 or time increment 13 in each clocking period A. Should a clocking period occur that does not contain a "1" pulse or a "0" pulse after the beginning of a transmission, the whole transmission is considered erroneous and is rejected. Such fault is termed a "no pulse" fault signifying that something has happened and the transmission has deviated from proper operation.

Under the second arbitrary rule or law set up in the transmission technique of this invention, a "1" pulse and a "0" pulse can not both appear in the same clocking period A. If such a condition is indicated, the whole transmission is considered erroneous and is rejected. Such condition is classed as a "double pulse" fault.

Detection of the "no pulse" fault and the "double pulse" fault can both be accomplished through a single flip flop circuit which, if not switched during a clocking period or if switched twice during a clocking period, can be made to signal the fault condition.

Referring again to FIGURE 2, in the clock period 1A, a "0" pulse was transmitted at the third time increment while "no pulse" was transmitted at the second time increment. Supposing, however, that extraneous noise should create a pulse exactly at the gated second time increment 13 of clock period 1A, no fault would be registered since a pulse was to have been transmitted at that time anyway. It is to be observed that if any extraneous noise occurs at any other time than during gated time increments 12 and 13, a pulse will not be received or recognized because of the narrow gating procedure utilized in the transmission technique.

Should noise eradicate a legitimate pulse, a "no pulse" fault would then be generated and again the transmission sequence would be rejected as faulty. The only way in which the herein disclosed transmission technique can be made to transmit a faulty signal from correctly applied code would be for pulse producing noise to occur at a "no pulse" position, that is, in exactly the proper phase, with an amplitude relation in respect to the signal so as to generate a false signal at "1" time increment and then, within the same clocking period, to produce a noise of particular character which would eradicate a legitimate signal so as to produce "no pulse" where one should exist. The probability of such simultaneous neutralizing and signaling pulses occurring within the gated times of a single clocking period is so remote as to be negligible in its influence on the accuracy of the self-checking character of the instant invention.

It will, of course, be understood that various changes may be made in the steps and their arrangement without departing from the scope of our invention as set forth in the appended claims.

What is claimed is:

1. A system for self-checking electronic pulse intelligence which comprises means for generating a clocking signal of preselected frequency, means for dividing the clocking signal into clocking periods each having distinct couplet positions, means for transmitting a superposed code pulse at one position only of each of the couplet positions, means for receiving the code pulse and distinguishing its position within each period, and means for rejecting the received intelligence as false whenever code pulses occur at both pulse positions within a clocking period and whenever no pulse is received within a clocking period.

2. A system for self-checking electronic pulse intelligence which comprises means for generating a clocking signal of preselected frequency and of sinusoidal character, means for dividing the clocking signal into clocking periods each having distinct couplet positions respectively at adjacent positive and negative sinusoids, means for transmitting a superposed code pulse at one position only of each of the couplet positions, means for receiving the code pulse and distinguishing its position within each period, and means for rejecting the received intelligence as false whenever code pulses occur at both pulse positions within a clocking period and whenever no pulse is received within a clocking period.

3. A system for self-checking electronic pulse intelligence which comprises means for generating a clocking signal of preselected frequency and of sinusoidal character, means for dividing the clocking signal into clocking periods each having distinct couplet positions respectively at the peak of a positive sinusoid and the peak of an adjacent negative sinusoid, means for transmitting a superposed code pulse at one position only of each of the couplet peak positions, means for receiving the code pulse and distinguishing its position within each period, and means for rejecting the received intelligence as false whenever code pulses occur at both pulse positions within a clocking period and whenever no pulse is received within a clocking period.

4. A system for self-checking electronic pulse intelligence which comprises means for generating a clocking signal of preselected frequency and of sinusoidal character, means for dividing the clocking signal into clocking periods, each having a starting time approximately at a neutral point on the sinusoidal wave signal, a pulsing time increment approximately 90° from starting time and another pulsing time increment approximately 180° from the first pulsing time increment, means for transmitting a superposed code pulse at one position only of each of the couplet pulsing time increments, means for receiving the code pulse and distinguishing its position within each period, and means for rejecting the received intelligence as false whenever code pulses occur at both pulse positions within a clocking period and whenever no pulse is received within a clocking period.

5. The system as set forth in claim 2 wherein all of the pulsing at positive sinusoid positions represent one class of binary "1's" and binary "0's" and all of the pulsing at negative sinusoid positions represent the other class of binary "1's" and binary "0's".

6. The system as set forth in claim 4 wherein all of the 90° increments represent one of a binary "1" and a binary "0" and all of the 180° increments represent the other of the binary "1" and a binary "0".

7. A system for self-checking electronic pulse intelligence comprising means for transmitting a code pulse at either of two distinct time positions within a predetermined time period, means for receiving the code pulse and distinguishing its position within said period, and means for rejecting the received intelligence as false whenever code pulses occur at both pulse positions within said period and whenever no pulse is received within said period.

8. The systems as set forth in claim 7 wherein the code pulse for one of said distinct time positions is a positive pulse and a negative pulse for the other of said time positions.

References Cited in the file of this patent
UNITED STATES PATENTS

| | | |
|---|---|---|
| 2,706,215 | Van Duuren | Apr. 12, 1955 |
| 2,707,209 | Ambrosio | Apr. 26, 1955 |
| 2,844,721 | Minkow | July 22, 1958 |